United States Patent
Moran et al.

(10) Patent No.: US 11,321,222 B2
(45) Date of Patent: May 3, 2022

(54) METHOD AND APPARATUS FOR DEBUGGING DEVICES

(71) Applicant: Arm IP Limited, Cambridge (GB)

(72) Inventors: Robert James Moran, Cambridge (GB); Arkadiusz Pawel Zaluski, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 16/594,799

(22) Filed: Oct. 7, 2019

(65) Prior Publication Data

US 2020/0117578 A1 Apr. 16, 2020

Related U.S. Application Data

(60) Provisional application No. 62/744,184, filed on Oct. 11, 2018.

(30) Foreign Application Priority Data

Apr. 4, 2019 (GB) ..................... 1904787

(51) Int. Cl.
*G06F 11/36* (2006.01)
*G06F 9/451* (2018.01)
(Continued)

(52) U.S. Cl.
CPC .......... *G06F 11/3664* (2013.01); *G06F 9/451* (2018.02); *G06F 11/362* (2013.01); *H04L 67/025* (2013.01)

(58) Field of Classification Search
USPC ....................................... 717/124
See application file for complete search history.

(56) References Cited

U.S. PATENT DOCUMENTS

| 6,618,854 B1 * | 9/2003 | Mann | ................. G06F 11/3664 |
| | | | 714/E11.21 |
| 7,543,277 B1 * | 6/2009 | Righi | ................. G06F 11/362 |
| | | | 709/221 |

(Continued)

FOREIGN PATENT DOCUMENTS

JP 2007087404 A 4/2007

OTHER PUBLICATIONS

Neophytou et al.; "Net-dbx-G: A Web-Based Debugger of MPI Programs Over Grid Environments"; IEEE International Symposium on Cluster Computing and the Grid (pp. 35-42); 2004 (Year: 2004).*

(Continued)

*Primary Examiner* — Qing Chen
*Assistant Examiner* — Clint Thatcher
(74) *Attorney, Agent, or Firm* — Patterson Thuente Pedersen, P.A.

(57) ABSTRACT

Techniques are described for debugging node devices. A node device may be connected to a host device for debugging purposes. A debugger, providing debug functionality, such as a debugging web application, may run on a remote server and be accessed via a web browser running at the host device, to debug the node device. Alternatively, the debugging web application may execute in the web browser running at the host device to debug the node device. In another alternative, the debugging web application may execute at a gateway device provided between the node device and the host device. In all cases the debugging web application is controlled via a debug user interface running at the web browser. Consequently, a user of the host device is not required to install a debugger at the host device in order to debug a node device.

13 Claims, 10 Drawing Sheets

(51) Int. Cl.
*H04L 29/08* (2006.01)
*H04L 67/025* (2022.01)

(56) References Cited

U.S. PATENT DOCUMENTS

| | | | | |
|---|---|---|---|---|
| 7,873,872 B1* | 1/2011 | Shillington | ............ | G06F 11/362 |
| | | | | 717/124 |
| 8,589,881 B2* | 11/2013 | Park | .................... | G06F 11/3664 |
| | | | | 717/124 |
| 9,292,397 B1 | 3/2016 | Kleyman et al. | | |
| 9,645,910 B1* | 5/2017 | Kaila | .................. | G06F 9/45516 |
| 2005/0050182 A1 | 3/2005 | Neville et al. | | |
| 2010/0107146 A1 | 4/2010 | Wrighton et al. | | |
| 2011/0107311 A1* | 5/2011 | McNulty | .................. | G06F 9/547 |
| | | | | 717/129 |
| 2011/0252404 A1 | 10/2011 | Park et al. | | |
| 2013/0339812 A1 | 12/2013 | Lau et al. | | |
| 2015/0033205 A1* | 1/2015 | Wintergerst | ........ | G06F 11/3668 |
| | | | | 717/124 |
| 2019/0138430 A1* | 5/2019 | Smiljanic | .............. | G06F 11/362 |
| 2020/0117578 A1* | 4/2020 | Moran | .................. | G06F 11/362 |

OTHER PUBLICATIONS

Wenyu et al.; "A Model of Remote Debugger Supporting Multiple Types of Connection"; 2011 International Conference on Electronics, Communications and Control (ICECC) (pp. 642-645); 2011 (Year: 2011).*

"Full Debugging Interface on Mbed-Enabled Platforms!"; Mbed.com website [full URL in ref.]; Apr. 2, 2013 (Year: 2013).*

Examination Report dated Mar. 4, 2021 for GB Application No. 1904787.7, 4 pages.

* cited by examiner

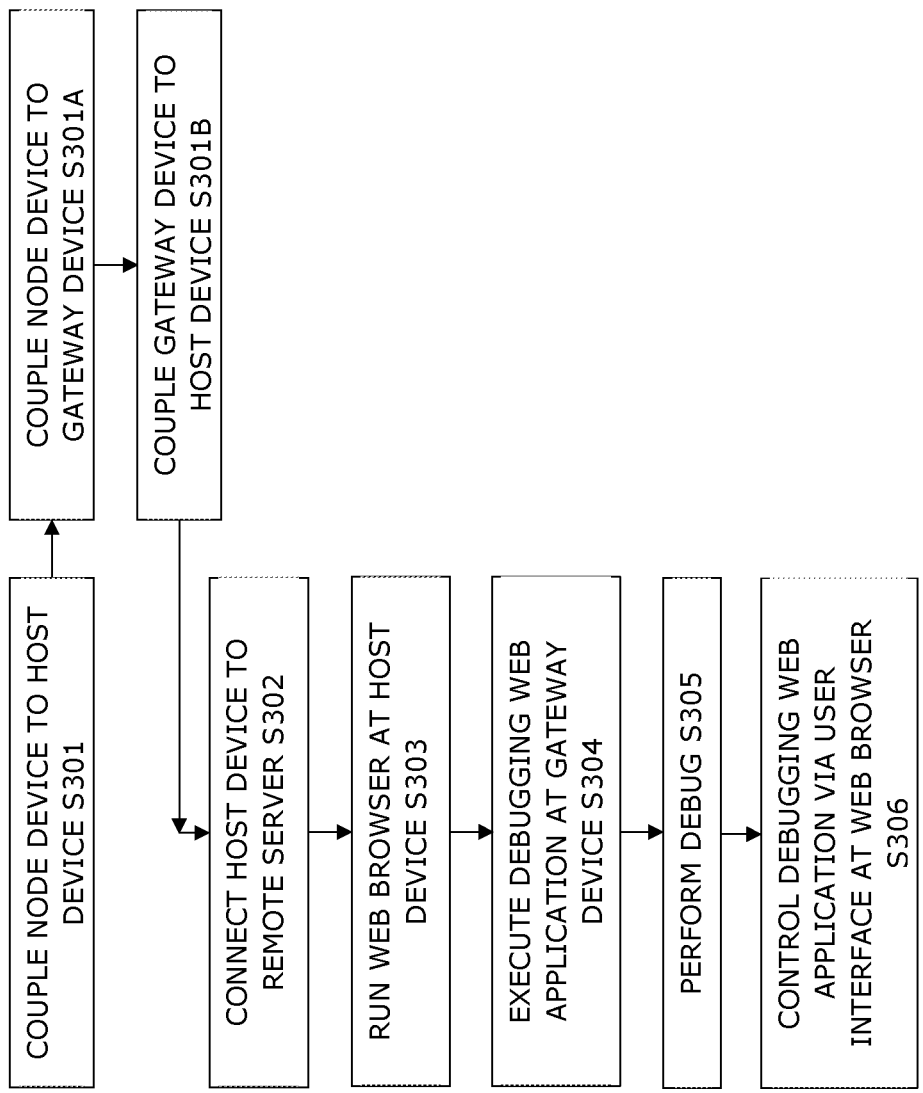

METHOD AND APPARATUS FOR DEBUGGING DEVICES

BACKGROUND

The present techniques relate to methods and apparatus for debugging devices. More particularly, the techniques relate to methods and apparatus for debugging devices via a web browser.

Cloud computing services are becoming more common and more and more devices are being connected to the cloud, for example as part of the Internet of Things (IoT). Relatively small IoT devices such as temperature sensors, healthcare monitors and electronic door locks can be connected to the cloud so that they can be accessed and controlled using remote systems. For example, a door comprising an electronic door lock may be remotely opened from a remote server, or data from a temperature sensor or healthcare monitor may be aggregated at a remote server and accessed from another device. Each of these IoT devices may require debugging at some stage during its lift-time. Conventionally, a debugging application is required to be downloaded and installed onto a host device, which is to be connected locally to the IoT device to be debugged, in order to debug the IoT device. However, this is often undesirable to a user. In addition, the requirement to download the debugging application limits the host device to being high performance laptops or desktop style computers.

SUMMARY

According to a first technique, there is provided a method of enabling web-based interaction with a debug interface of a node device. The method comprises: communicatively coupling a host device to the node device for debugging to enable access to the debug interface of the node device; providing a web-based interface at the host device for communicating with a debugger, the debugger to provide debug functionality; and in response to input at the web-based interface, communicating command data to the debugger to enable the debugger to communicate with the debug interface of the node device.

According to a second technique, there is provided a computer readable storage medium comprising computer code for performing the methods described herein.

According to a third technique, there is provided a host device to enable web-based interaction with a debug interface of a node device. The host device comprises: communication circuitry to communicatively couple the host device to the node device for debugging, to enable access to the debug interface of the node device; a web-based interface for communicating with a debugger, the debugger to provide debug functionality; and wherein, in response to input at the web-based interface, the host device is configured to communicate command data to the debugger to enable the debugger to communicate with the debug interface of the node device.

According to a fourth technique, there is provided a system for enabling web-based interaction with a debug interface of a node device. The system comprises: the host device described herein, wherein the host device is configured to run a web browser and the web-based interface is run in the web browser; and a remote server comprising the debugger, wherein the debugger is accessed from the web browser.

According to a fifth technique, there is provided a system for enabling web-based interaction with a debug interface of a node device. The system comprises: the host device described herein, wherein the host device is configured to run a web browser and the web-based interface is run in the web browser; and a gateway device communicatively coupled to the node device for debugging, wherein the gateway device comprising the debugger.

According to a sixth technique, there is provided a method of debugging a node device. The method comprises: communicatively coupling the node device for debugging to a host debug device; and communicating diagnostic data between a web-based debug function and the node device for debugging.

According to a seventh technique, there is provided apparatus for debugging a node device. The apparatus comprises: a web application configured to perform diagnostic operations and to interface with the node device via the web application.

BRIEF DESCRIPTION OF THE DRAWINGS

Embodiments will now be described with reference to the accompanying Figures of which:

FIG. 10 illustrates another process flow diagram for debugging a node device.

DETAILED DESCRIPTION

Techniques are described for debugging node devices. A node device may be connected to a host device for debugging purposes. A debugger, providing debug functionality, such as a debugging web application, may run on a remote server and be accessed via a web browser running at the host device, to debug the node device. Alternatively, the debugging web application may execute in the web browser running at the host device to debug the node device. In another alternative, the debugging web application may execute at a gateway device provided between the node device and the host device. In all cases the debugging web application is controlled via a debug user interface running at the web browser. Consequently, a user of the host device is not required to install a debugger at the host device in order to debug a node device.

Reference will now be made in detail to the embodiments, examples of which are illustrated in the accompanying Figures. In the following detailed description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

Typically, compilers of debugging software operate in isolation from the node devices that they are compiling the debugging software for and have no capability to interact with the node devices. However, according to the techniques describe herein a connection may be established to the node device to be debugged via web browsers, which provides the compilers of debugging software with debug and diagnosis capabilities.

Figure 1:
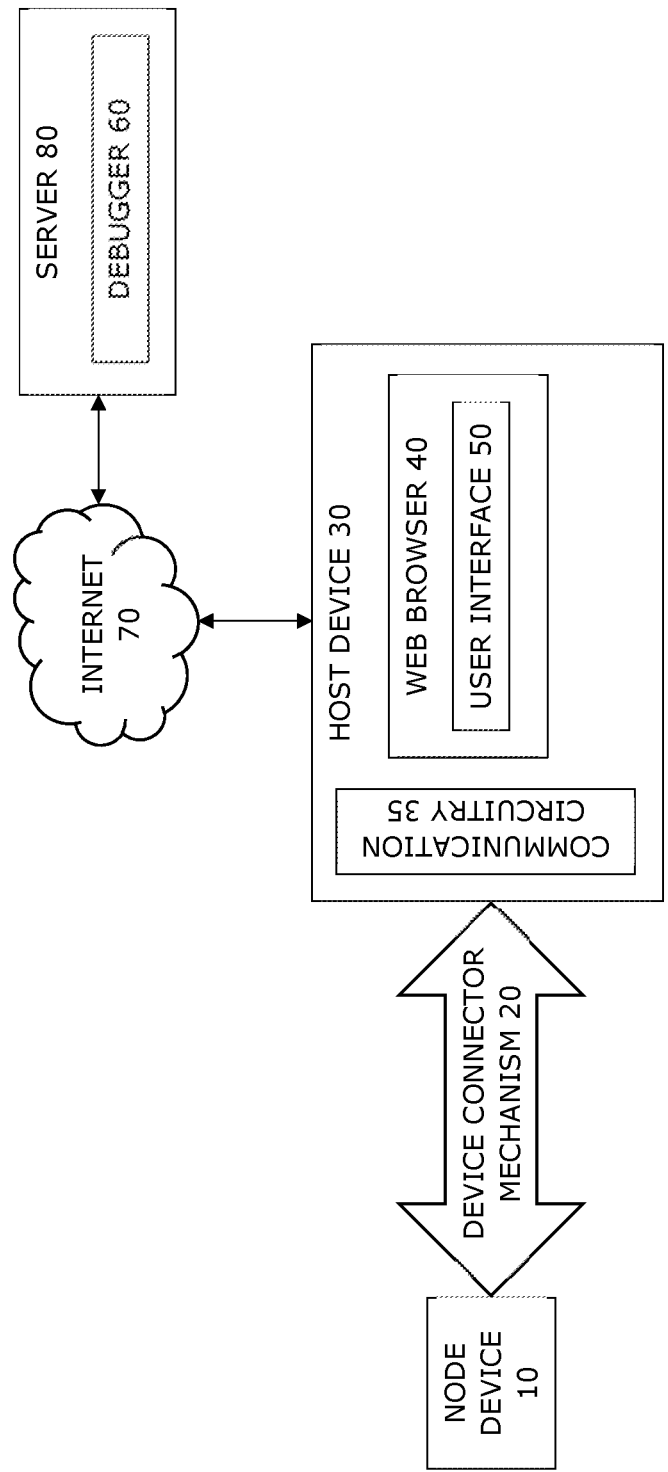
FIG. 1 illustrates schematically apparatus for debugging a node device via a web browser.

FIG. 1 illustrates schematically apparatus for debugging a node device. As illustrated in FIG. 1, a host device 30 comprises communication circuitry for communicatively coupling a node device 10 to the host device 30 for debugging purposes. The node device 10 is local to the host device 30 in FIG. 1. A node device may be any device which is part of an interconnected system of devices, such as devices considered part of the internet of things (IoT). The node device as described herein is the device which is to be debugged. Exemplary node devices comprise temperature sensors, healthcare monitors, electronic door locks, smart light bulbs, smoke detectors etc. Exemplary host devices comprise tablets, cell phones, energy efficient laptops, high performance laptops, desktop style computers etc.

The node device 10 is communicatively coupled to the host device 30 by a device connector mechanism 20. Exemplary device connector mechanisms comprise:

WebUSB—connecting a USB port to a web browser, a node device being connected to the USB port;

WebNFC—using Near-Field Communication (NFC) to connect a node device to a web browser;

Web Bluetooth—connecting a Bluetooth node device to a web browser;

WebSerial—connecting a serial port to a web browser, a node device being connected to the serial port;

Ethernet—connecting an Ethernet port to a web browser, a node device being connected to the Ethernet port;

Wireless—using Wi-Fi™, Zigbee™, 6LoWPAN, radio frequency communication (RFID) etc to connect a node device to a web browser.

Browser extensions for USB connections (e.g. Chrome Extensions);

Small agent installed on host device which communicates with a web browser. However, it will be appreciated that other device connector mechanisms may be used.

The device connector mechanism 20 may be used to locally connect the node device 10 to the host device 30. When a node device 10 is connected to the host device 30 by a wireless device connector mechanism 20, such as via Web Bluetooth, an users permission may be required to be obtained before the connection is made.

A web browser 40 is running on the host device 30. The device connector mechanisms 20 enables the web browser 40 to securely connect to the node device 10. A device-to-browser connection is established by the device connector mechanism 20, and the node device 10 is able to communicate with code running in the web browser 40 and vice versa. For example, when the node device 10 connects to the USB port of the host device 30, then the web browser 40 is able to securely communicate with the node device 10 using WebUSB.

The host device 30 is also connected to the internet 70 using wired or wireless communication. For example, the host device 30 may use wireless communication such as Wi-Fi™, Zigbee™, Bluetooth™, 6LoWPAN etc., may use short range communication such as radio frequency communication (RFID) or near field communication (NFC), or may use cellular networks, such as 3G, 4G, 5G etc. to connect to the internet 70.

A web-based debugger, such as a debugging web application 60, is provided at a remote server 80. As known in the art, a debugger is a computer program for testing other "target" programs in order to identify bugs in the target program. In order to execute a debug process, the web browser 40 is used to access the debugger 60, running at the remote server 80, over the network 70. Consequently, a user of the host device is not required to download and install the debugger 60 at the host device. The debugging web application 60 is executed on the remote server 80 but is accessed via the web browser 40. The debugger 60 provides debug functionality such as debugging, stepping and/or tracing.

The debugger 60 is for debugging one or more target programs running at the node device 10 connected via the device connector mechanism 20. A debug protocol compatible with the device connector mechanism 20 may be used to communicate with the node device 10. For example, when the node device 10 is connected using WebUSB, a debug protocol such as CMSIS-DAP provided by Arm® Ltd may be used. Alternatively, a debug protocol such as J-Link provided by Segger®, or ST-LINK provided by STMicroelectronic® may be used.

A debug interface, provided at the node device 10, is the interface through which the node device 10 sends and receives debug messages (such as the CMSIS-DAP commands) to and from the debugger 60. In some node devices 10 a specific physical port is provided at the device 10 to enable debug, referred to as a debug port. According to one example, when the node device 10 is connected to the host device 30 using WebUSB, the node device 10 is accessed via a USB port at the node device 10, and a debug protocol such as CMSIS-DAP is used to communicate between the debugger 60 and the debug interface, provided at the node device 10. The debug interface at the node device 10 then communicates via JTAG or SWD with the target program running at the node device 10.

A debugging user interface 50 which is supported by the debugger 60, runs in the web browser 40 at the host device 30, and thus is a web-based interface. The debugging user interface 50 may be generated by a web application running in the browser. The debugging user interface 50 controls the debugger 60 when a debug process is running. The user interface 50 enables a user to monitor and control the debugging process, such as stopping the target program/debugging process, restarting the target program/debugging process, setting and managing breakpoints, flashing the node device 10, providing stepped execution etc. Other well-established debug and diagnostic information capture techniques may also be performed by the debugger 60.

Figure 2:
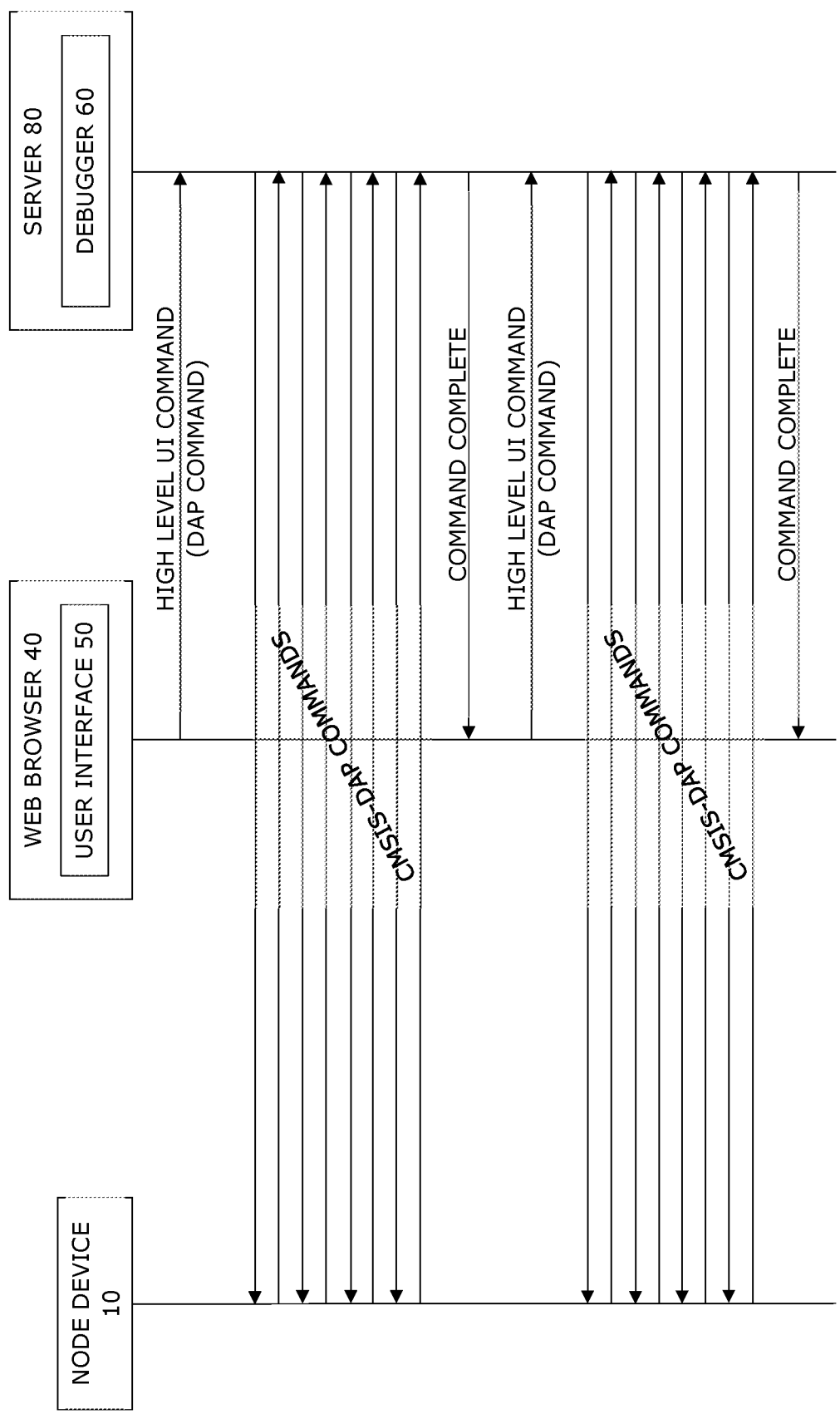
FIG. 2 illustrates schematically an exemplary communication flow for debugging a node device using the apparatus of FIG. 1.
Figure 5:
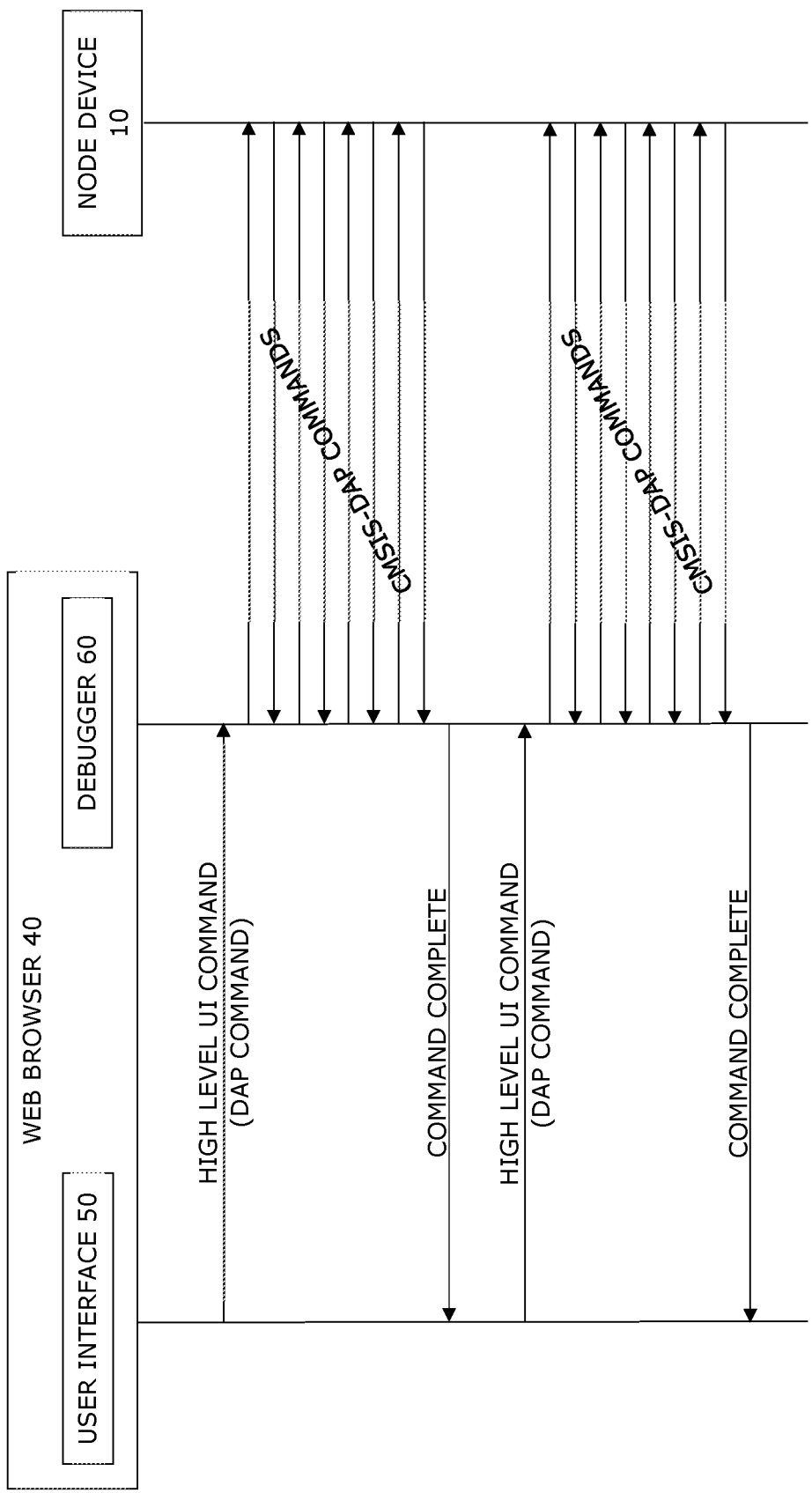
FIG. 5 illustrates schematically an exemplary communication flow for debugging a node device using the apparatus of FIG. 4.
Figure 9:
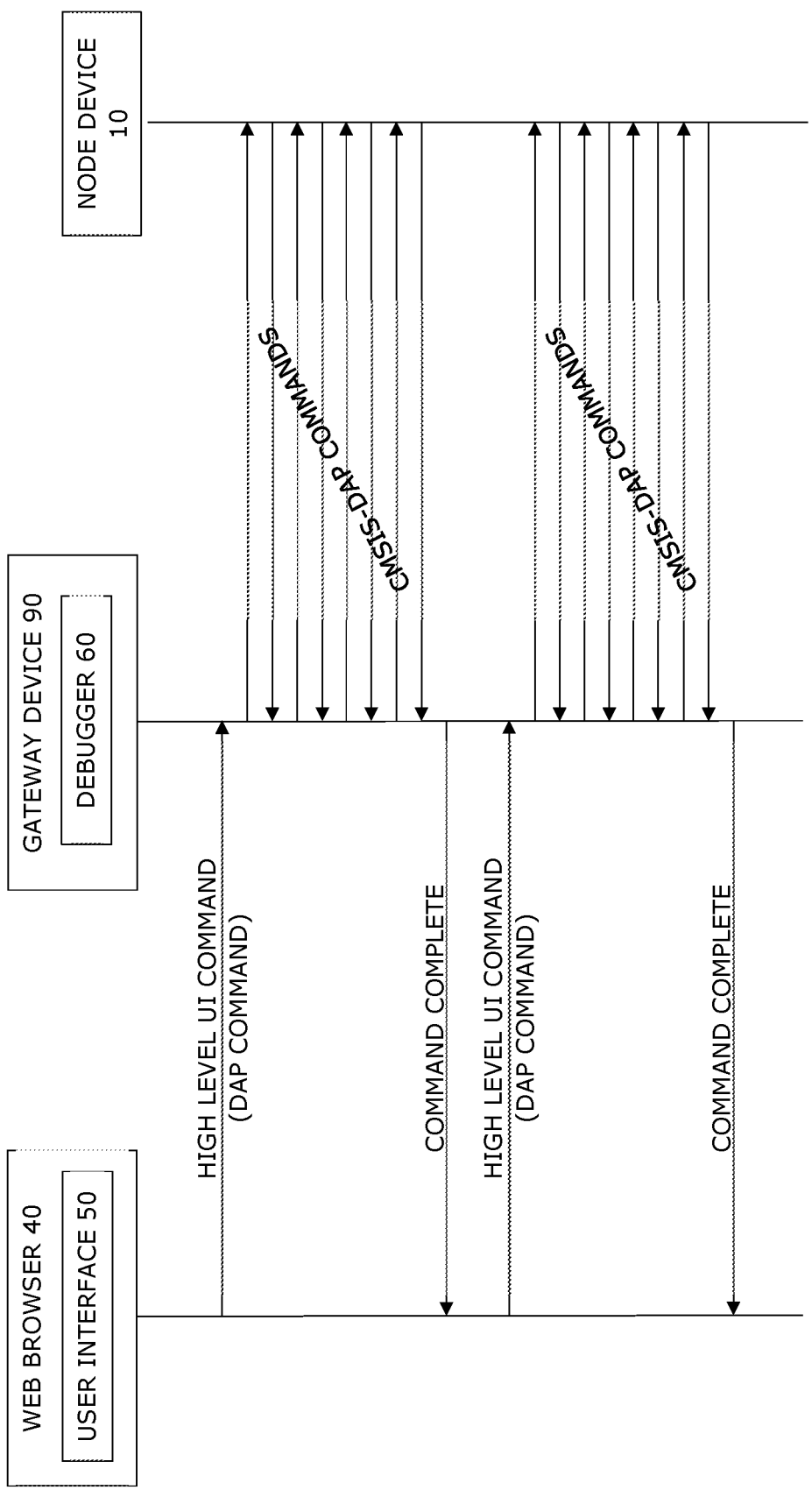
FIG. 9 illustrates schematically an exemplary communication flow for debugging a node device using the apparatus of FIG. 7 or FIG. 8.

Debug command data is communicated between the web based interface 50, the debugger 60 and the node device 10. The command data may be high level user interface debug commands sent between the debugging user interface 50 and the debugger 60, such as start, stop, step, etc. commands. In addition, command data may be debug commands communicated between the host device 30 and node device 10 over the debug interface at the node device 10. The debug commands are much more frequent and undertake many register reads and writes for each of the high level user interface debug commands. FIGS. 2, 5, and 9 illustrate the high-level debug commands as 'UI commands' and the debug commands 'CMSIS commands'.

The command data may comprise diagnostic data, configuration data, control information, data values, status information etc. Furthermore, diagnostic operations may be performed by the debugger 60 at the node device, such as reads and writes to register memory.

The command data may comprise the high level debug commands communicated between the debugging user interface 50 and the debugger 60, and/or the debug commands communicated between the host device 30 and node device 10. The command data may comprise one or more of: commands to firmware flash the node device, commands to run tests at the node device, commands to perform serial monitoring of one or more node devices, commands to trace for debugging purposes etc.

As illustrated in FIG. 1, the debugger 60 is executed remotely on the server 80, for example in a cloud, and accessed and controlled via the debugging user interface 50 running in the web browser 40 at the host device 30. The debugging user interface 50 is provided at a device different from the debugger 60. In addition, the connection to the node device 10 to be debugged is via the web browser 40, the node device 10 being local to the host device 30.

In order to debug a node device 10, the node device 10 is communicatively coupled to the host device 30, in FIG. 1 via the device connection mechanism 20, and the debug function 60 running at the remote server 80 is accessed via the web browser 40 at the host device 30. The debugging interface 50 running at the web browser 40 is able to access the node device 10, via the connection between the host device 30 and the node device 10, such that the debugging interface 50 may control debugging of the node device 10 by the debug function 60 running at the remote sever 80 and accessed via the web browser 40 at the host device 30.

The web browser 40 provides protocol translation between the debugger 60 and the node device 10. The embodiment illustrated in FIG. 1 may be advantageous since the debugger 60 does not need to be installed at the host device. In addition, the software code of the debugger 60 does not need to be re-written in a programming language compatible with execution within a web browser 40, since the debugger 60 is run remotely on the server 80 and only accessed via the web browser 40.

However, debugging requires a lot of back-and-forth between the node device 10 to be debugged and the debugger 60 and therefore may be considered very chatty. FIG. 2 illustrates schematically an exemplary communication flow for debugging a node device using the apparatus of FIG. 1. When debugging using the apparatus of FIG. 1, there is a lot of back-and-forth between the node device 10 and the web-based debug function 60, which goes via the web browser 40. Consequently, the embodiment of FIG. 1 may suffer latency issues due to the physical distance between the node device 10 and the debugger 60.

Figure 3:
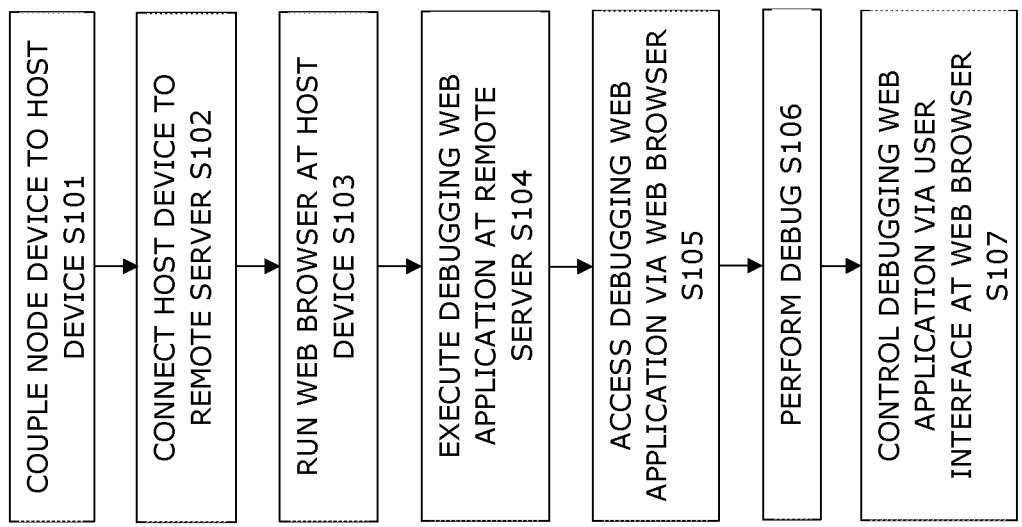
FIG. 3 illustrates a process flow diagram for debugging a node device.

FIG. 3 illustrates a process flow diagram for debugging a node device 10. The process illustrated in FIG. 3 may be performed by the apparatus illustrated in FIG. 1. As illustrated in FIG. 3, the process begins at Step S101, when a node device 10 is communicatively coupled to a local host device 30. The host device 30 running the web browser 40 is connected to the remote server 80 at Steps S102 and S103. The web-based debug function 60 is executed at a remote server 80 and accessed via the web browser 40 at Steps S104 and S105, such that the debugger 60 may debug the node device 10 at Step S106. The debugging process is controlled via the debugging user interface 50 running in the web browser 40 at Step S107. A skilled person will understand that steps S104 to S107 may be performed contemporaneously.

Figure 4:
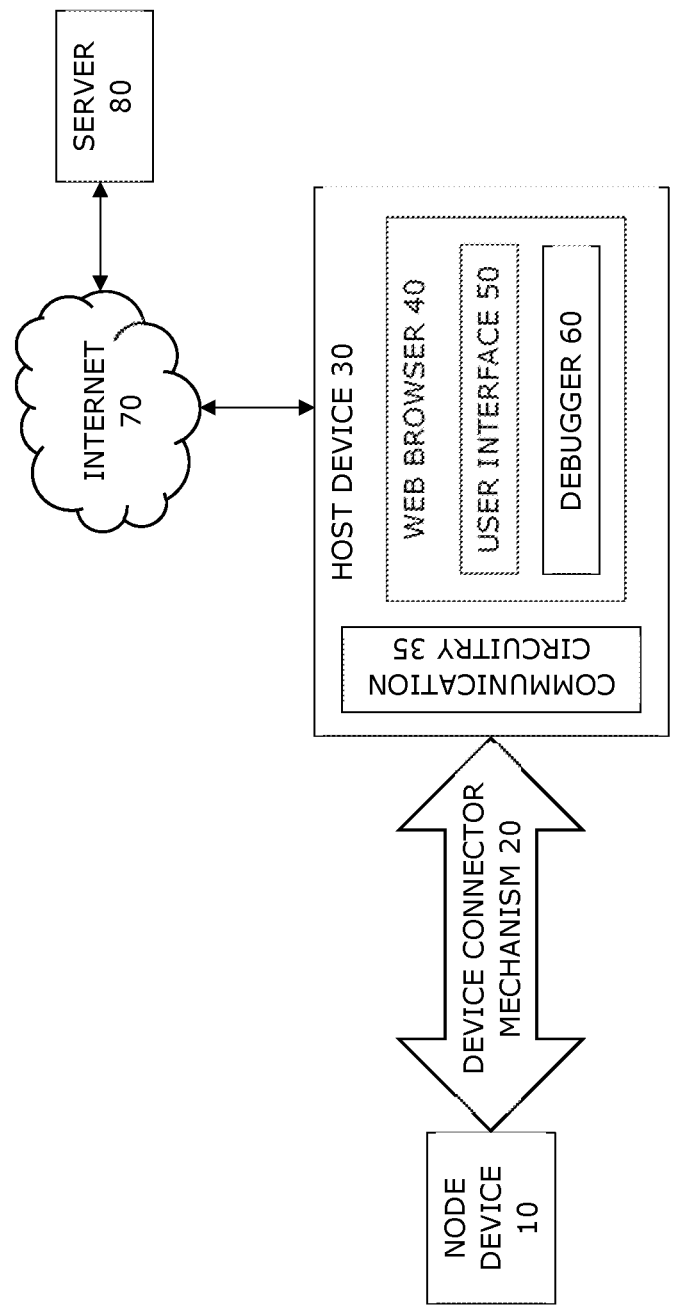
FIG. 4 illustrates schematically another apparatus for debugging a node device via a web browser.

FIG. 4 illustrates schematically another arrangement of apparatus for debugging a node device via a web browser. In FIG. 4, the debugging web application 60 is written in a programming language compatible with execution within a web browser 40, such that the debugger 60 runs in the web browser, not on the remote server 80. The remote server 80 serves the debugging web page and associated code to the web browser 40. The debugger 60 is then executed in the web browser 40, such that the debugger does not need to be installed at the host device 30.

Similar to FIG. 1, in FIG. 4, a node device 10 is locally connected to a host device 30 by a device connector mechanism 20. The host device 30 is also connected to the remote server 80 via the internet 70 using wired or wireless communication. However, according to this embodiment, the debugging web application 60 is implemented in a programming language compatible with execution within a web browser 40 and with interfacing with the node device 10 via the device connector mechanism 20. For example, WebUSB is a JavaScript application programming interface (API). When a node device 10 is connected using WebUSB, the debugger 60 may be implemented in JavaScript.

According to the embodiment of FIG. 4, the debugger browser logic is communicated from the server 80 to the web browser 40 and runs in the web browser 40. However, a user of the host device is not required to install the debugger at the host device since the debugging web application 60 is executed in the web browser 40.

As in the previous embodiment, the web browser 40 controls the debugger 60, via a user interface 50 when a debug process is running. Therefore, a user interface 50 supported by the debugger 60, is implemented alongside the debugger 60 and both run in the web browser 40. The connection to the node device 10 to be debugged is via the web browser 40, the node device 10 being local to the host device 30 running the web browser 40. In order to debug a node device 10, the node device 10 is communicatively coupled to the host device 30, in FIG. 4 via the device connection mechanism 20, and the debug function 60 is executed at the web browser 40 at the host device 30. The debugging interface 50 also running at the web browser 40 is able to access the node device 10, via the connection between the host device 30 and the node device 10, such that the debugging interface 50 may control debugging of the node device 10 by the debugger 60 running at the web browser 40 at the host device 30.

FIG. 5 illustrates schematically an exemplary communication flow for debugging a node device using the apparatus of FIG. 4. The node device 10 of FIG. 5 is connected to the host device 30 using WebUSB, and a debug protocol such as CMSIS-DAP is used to communicate with the node device 10. The debugger 60 is implemented in a programming language compatible with execution within a web browser 40. In addition, the debugger 60 is implemented in a programming language compatible with the debug protocol, such as CMSIS-DAP, used to communicate with the node device. According to FIG. 5, the debugger 60 is implemented in JavaScript and debugging is performed using a debug adapter, such as Debug Adapter Protocol (DAP) (https://microsoft.github.io/debug-adapter-protocol/).

The physical distance between the node device 10 and the debugger 60 as illustrated in FIG. 4 is reduced, when compared to the physical distance between the node device 10 and the debugger 60 as illustrated in FIG. 4. This is because, in FIG. 4, the debugger is executed in the web browser 40 at the host device, which is local to the node device 10. Consequently, as illustrated schematically in the communication flow diagram of FIG. 5, the apparatus of FIG. 4 suffers less latency issues than the apparatus of FIG. 1.

Figure 6:
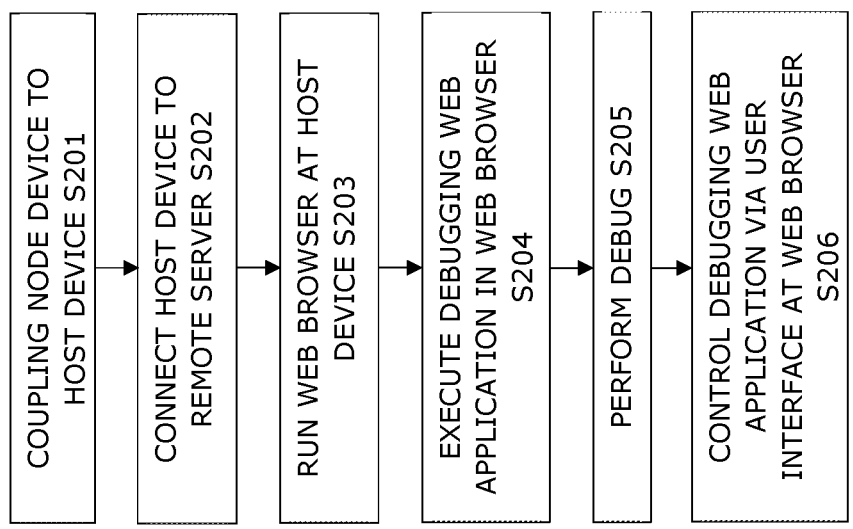
FIG. 6 illustrates another process flow diagram for debugging a node device.

FIG. 6 illustrates a process flow diagram for debugging a node device 10. The process illustrated in FIG. 6 may be performed by the apparatus illustrated in FIG. 4. As illustrated in FIG. 6, the process begins at Step S201, when a node device 10 is communicatively coupled to a local host device 30. The host device 30 running the web browser 40 is connected to the remote server 80 at Steps S202 and S203. The web-based debug function 60 is executed within the web browser 40 at Step S204, such that the debugger 60 may debug the node device 10 at Step S205. The debugging process is controlled via the user interface 50 running in the web browser 40 at Step S206. A skilled person will understand that steps S204 to S206 may be performed contemporaneously.

Figure 7:
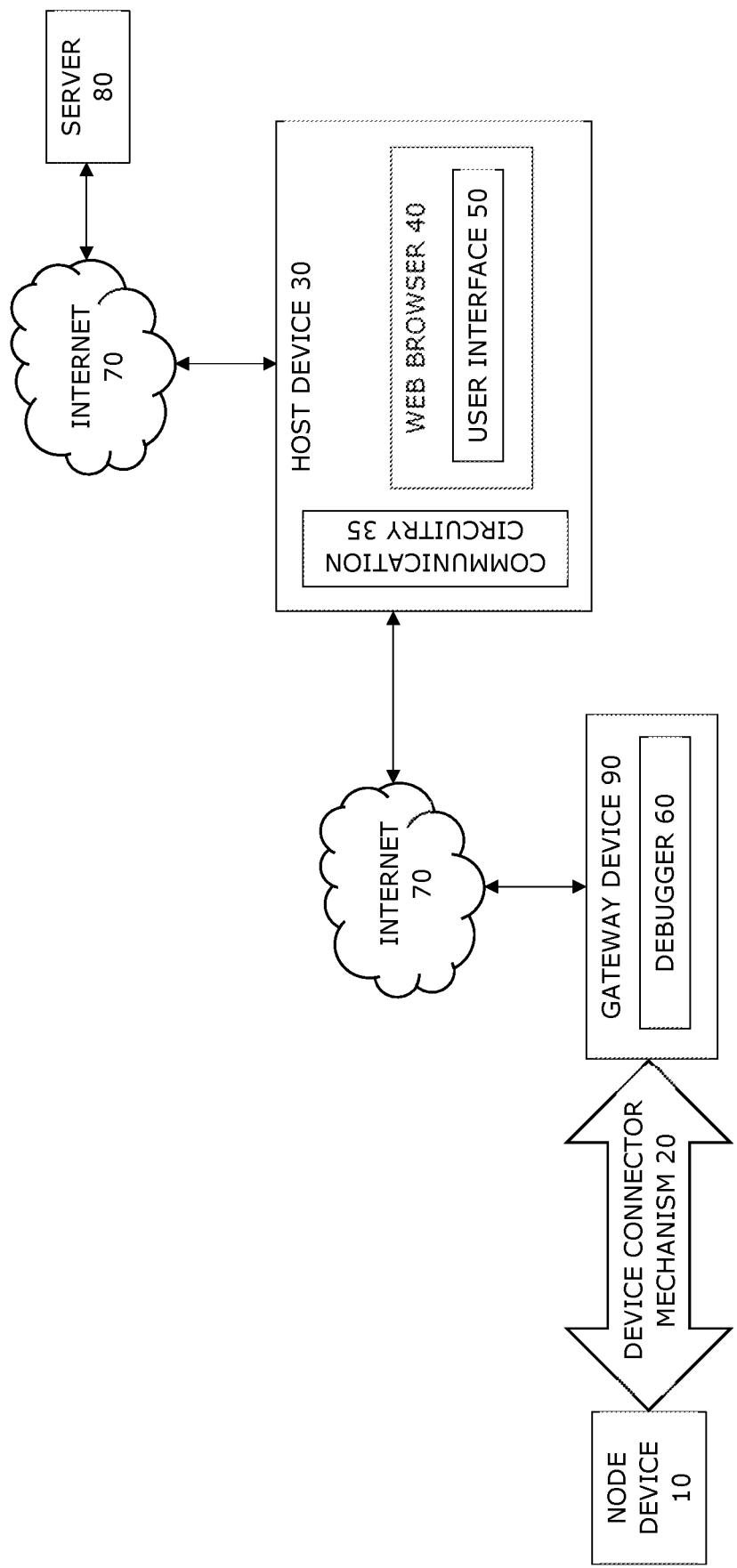
FIG. 7 illustrates schematically another apparatus for debugging a node device via a web browser

FIG. 7 illustrates schematically another arrangement of apparatus for debugging a node device via a web browser. Since debugging is often very chatty, it may be desirable to connect the node device 10 to the closet physical device, which is capable of providing an interface between the node device 10 and the remote server 80 for debugging. In FIG. 7, the node device 10 is locally connected to an intermediary device, such as gateway device 90, by a device connector mechanism 20. The device connector mechanism 20 used to connect the node device 10 to the gateway device 90 may be any one of the exemplary device connector mechanisms 20 described herein.

Figure 8:
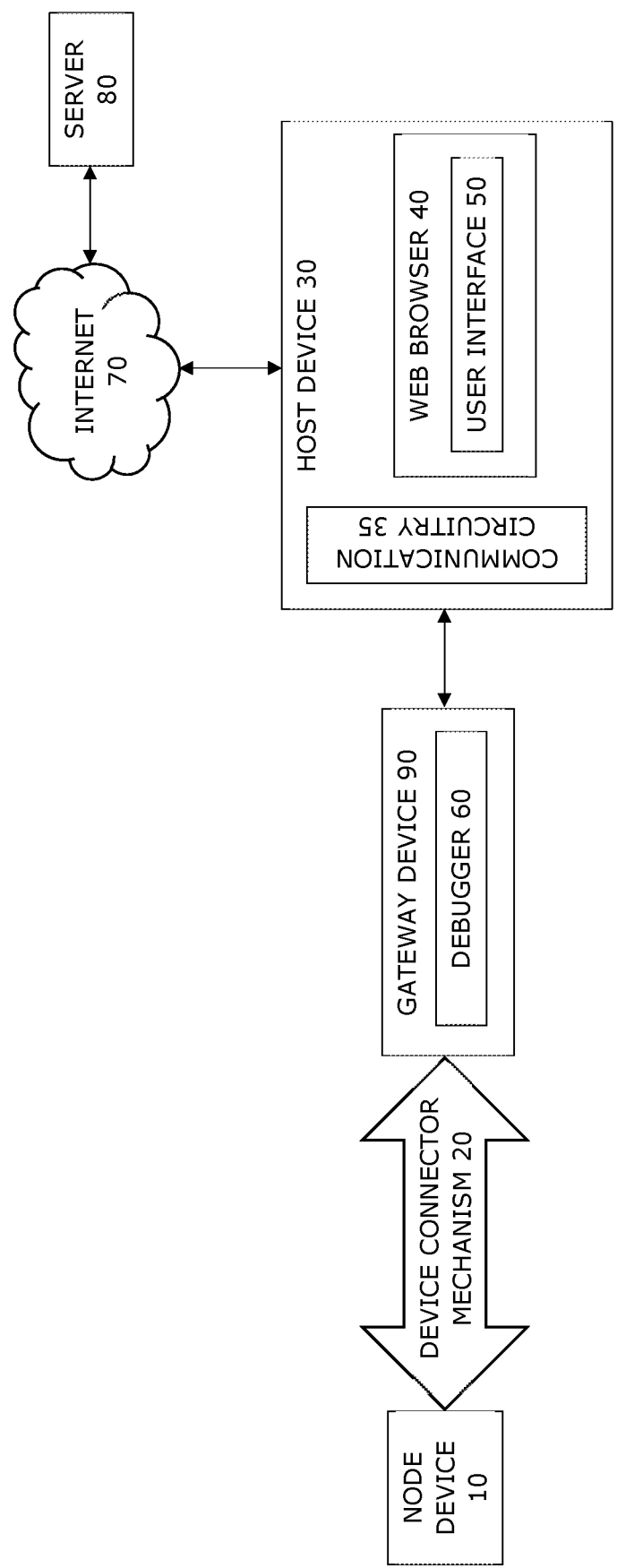
FIG. 8 illustrates schematically another apparatus for debugging a node device via a web browser

The gateway device 90 may be a device such as a router etc., and may be connected to the node device 10, either via an established connection to the node device 10 or via another port on the gateway device 90 to which a node device 10 may be further connected for debugging purposes. According to the embodiment illustrated in FIG. 7, the node device 10 is not connected to the host device 30 via a device connector mechanism 20. Instead, the host device 30 interacts with the node device 10 indirectly via the gateway device 90. The host device 30 may connect to the gateway device 90 using wired or wireless communication. For example, the host device 30 may use wireless communication such as Wi-Fi™, Zigbee™, Bluetooth™, 6LoWPAN etc., may use short range communication such as radio frequency communication (RFID) or near field communication (NFC), or may use cellular networks, such as 3G, 4G, 5G etc. to connect to the gateway device 90. FIG. 7 illustrates the node device 10 connecting to the gateway device via the internet 70. FIG. 8 illustrates the node device 10 directly connecting to the gateway device.

Similar to FIGS. 1 and 4, the host device 30 is also connected to the remote server 80 via the internet 70 using wired or wireless communication. In addition, similar to the embodiment, of FIG. 1, the web-based debugger is a debugging web application. However, according to the embodiment illustrated in FIG. 7, the debugging web application 60 is executed at the gateway device 90, rather than at the remote server 80. The gateway device 90, being locally connected to the node device 10 to be debugged by a device connector mechanism 20. In addition, the debugger 60 is implemented in a programming language compatible with interfacing with the node device 10 via the device connector mechanism 20. For example, WebUSB is a JavaScript application programming interface (API). When a node device 10 is connected using WebUSB, the debugger 60 may be implemented in JavaScript.

The debugger does not need to be downloaded to the gateway device 90, since, it would already be implemented on the gateway device.

According to FIG. 7, the gateway device 90 runs the debugger 60, whilst the user interface 50, which is supported by the debugger 60 provided at the gateway device 90, is run at the web browser 40. As with the embodiments illustrated in FIGS. 1 and 4, web browser 40 is used to control the debugger 60. The debugger 60 is accessed and controlled via the user interface 50 running in the web browser 40. The web browser 40 runs at a device different from debugger 60 which runs at the gateway device 90.

In order to debug a node device 10, the node device 10 is communicatively coupled to the host device 30. In FIGS. 7 and 8 the node device 10 is communicatively coupled to the host device 30 via the gateway device 90. The node device 10 is communicatively coupled to the gateway device via the device connection mechanism 20, and the gateway device is communicatively coupled to the host device 30. The debugger 60 is executed at the gateway device 90. The debugging interface 50 running at the web browser 40 is able to access the node device 10, via the connection between the host device 30 and the node device 10, via the gateway device, such that the debugging interface 50 may control debugging of the node device 10 by the debugger 60 running at the gateway device 90.

FIG. 9 illustrates schematically an exemplary communication flow for debugging a node device using the apparatus of FIG. 7. The node device 10 of FIG. 7 is connected to the gateway device 90 using WebUSB, and a debug protocol such as CMSIS-DAP is used to communicate with the node device 10. The physical distance between the node device 10 and the debugger 60 as illustrated in FIG. 7 is reduced, when compared to the physical distance between the node device 10 and the debugger 60 as illustrated in FIG. 1. This is because, in FIG. 7, the debugger is executed at the gateway device 90, which is local to the node device 10. Consequently, as illustrated schematically in the communication flow diagram of FIG. 9, the apparatus of FIG. 7 suffers less latency issues than the apparatus of FIG. 1.

The communication flow illustrated in FIG. 9, equally applies to the apparatus of FIG. 8.

FIG. 10 illustrates a process flow diagram for debugging a node device. The process illustrated in FIG. 10 may be performed by the apparatus illustrated in FIG. 7. As illustrated in FIG. 10, the process begins at Step S301, when a node device 10 is communicatively coupled to a host device 30. In order to communicatively couple the node device 10 to the host device 30, the node device 10 is coupled to a gateway device 90 at step S301A and the gateway device 90 is coupled to the host device 30 at step S301B. The host device 30 running the web browser 40 is connected to the remote server 80 at Steps S302 and S303. The web-based debug function 60 is executed at the gateway device 90 at Steps S304, such that the debugger 60 may debug the node device 10 at Step S305. The debugging process is controlled via the debugging user interface 50 running in the web browser 40 at Step S306. A skilled person will understand that steps S304 to S306 may be performed contemporaneously.

The embodiments described herein where the node device 10 is locally connected to the gateway device 90 or the host device 30 by a wireless device connector mechanism 20 may be advantageous in scenarios where it is challenging to access the node device 10 and/or to facilitate the use of server farms of test devices.

According to the embodiments described herein, a user of the host device 30 is not required to install the debugger 60 at the host device 30. According to the embodiment described with reference to FIG. 1, the debugger is executed at a remote server, were all the "heavy lifting" is performed. Therefore, the range of host devices 30 capable of debugging a node device 10 is more flexible and is not limited to high performance laptops or desktop style computers which are conventionally used for such activities.

Although the above description refers to providing a web-based debugger to local node devices, the apparatus and methods described herein could also be used to deliver other types of IoT tooling's to local node devices, such as firmware flashing, running tests, serial monitoring, tracing etc.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a method of enabling web-based interaction with a debug interface of a node device.

According to further techniques, communicating the command data comprises communicating user interface command data between the web-based interface and the debugger.

According to further techniques, the method further comprises: communicating debug command data between the debugger and the debug interface of the node device.

According to further techniques, the method further comprises: performing diagnostic operations at the node device for debugging.

According to further techniques, the debugger comprises a debugging web application executed at a remote server, and the method further comprises: running a web browser at the host device; and accessing the debugging web application from the web browser.

According to further techniques, the debugger comprises a debugging web application, and the method further comprises: running a web browser at the host device; and executing the debugging web application in the web browser.

According to further techniques, the method further comprises: running the web-based interface in the web browser.

According to further techniques, the method further comprises: communicatively coupling a gateway device between the node device for debugging and the host device.

According to further techniques, the debugger comprises a debugging web application, and the method further comprises: executing the debugging web application at the gateway device.

According to further techniques, communicatively coupling the node device to the gateway device comprises connecting the node device to the gateway device using a device connector mechanism.

According to further techniques, communicatively coupling the node device to the host device comprises connecting the node device to the host device using a device connector mechanism.

According to further techniques, the device connector mechanisms comprise any one of: WebUSB; WebNFC; Web Bluetooth; WebSerial; Ethernet.

According to further techniques, the device connector mechanisms comprises a wireless device connector mechanisms, and the method further comprises: obtaining an users permission prior to wirelessly communicatively coupling the node device to the host device.

According to further techniques, the command data comprises one or more of: commands to firmware flash the node device, commands to run tests at the node device, commands to perform serial monitoring of one or more node devices, commands to trace.

According to further techniques, the debug command data comprises CMSIS-DAP commands.

According to further techniques, the user interface command data comprises DAP commands.

Techniques are also described providing a host device to enable web-based interaction with a debug interface of a node device.

According to further techniques, the command data comprises user interface command data communicated between the web-based interface and debugger.

According to further techniques, the user interface command data comprises DAP commands.

According to further techniques, communicatively coupling the node device to the host device comprises connecting the node device to the host device using a device connector mechanism.

According to further techniques, the device connector mechanisms comprise any one of: WebUSB; WebNFC; Web Bluetooth; WebSerial; Ethernet.

According to further techniques, the debugger is provided at the host device.

According to further techniques, the host device is configured to run a web browser, the web-based interface is run in the web browser and the debugger is executed in the web browser.

The invention claimed is:

1. A method of enabling web-based interaction with a debug interface of a node device, the method comprising:
communicatively coupling a host device to the node device for debugging to enable access to the debug interface of the node device;
providing a web-based interface at the host device for communicating with a debugger program to test a target program running at the node device, wherein the debugger program is executed at a gateway device router communicatively coupled between the node device and the host device, and wherein the router is locally connected to the node device; and
in response to input at the web-based interface, communicating command data to the router to enable the debugger program executing at the router to communicate with the debug interface of the node device to test the target program.

2. The method of claim 1, wherein communicating the command data comprises communicating user interface command data between the web-based interface and the debugger program.

3. The method of claim 1, further comprising:
communicating debug command data between the debugger program and the debug interface of the node device.

4. The method of claim 1, further comprising:
performing diagnostic operations at the node device for debugging.

5. The method of claim 1, wherein communicatively coupling the node device to the router comprises connecting the node device to the router using a device connector mechanism.

6. The method of claim 1, wherein communicatively coupling the node device to the host device comprises connecting the node device to the host device using a device connector mechanism.

7. The method of claim 5, wherein the device connector mechanism comprises at least one of: WebUSB; WebNFC; Web Bluetooth; Web Serial; Ethernet.

8. The method of claim 5, wherein the device connector mechanism comprises a wireless device connector mechanism, and the method further comprises:
obtaining permission of a user prior to wirelessly communicatively coupling the node device to the host device.

9. The method of claim 1, wherein the command data comprises one or more of: commands to firmware flash the node device, commands to run tests at the node device, commands to perform serial monitoring of one or more node devices, commands to trace.

10. The method of claim 3, wherein the debug command data comprises CMSIS-DAP commands.

11. The method of claim 2, wherein the user interface command data comprises DAP commands.

12. A host device to enable web-based interaction with a debug interface of a node device, the host device comprising:
communication circuitry to communicatively couple the host device to the node device for debugging, to enable access to the debug interface of the node device;
a web-based interface for communicating with a debugger program to test a target program running at the node device, wherein the debugger program is executed at a router, and wherein the router is locally connected to the node device; and
wherein, in response to input at the web-based interface, the host device is configured to communicate command data to the router to enable the debugger program executing at the router to communicate with the debug interface of the node device to test the target program.

13. A system for enabling web-based interaction with a debug interface of a node device, the system comprising:
a host device comprising:
communication circuitry to communicatively couple the host device to the node device for debugging, to enable access to the debug interface of the node device;
a web-based interface for communicating with a debugger program to test a target program running at the node device, and wherein the debugger program is executed at a router, and wherein the router is locally connected to the node device; and
wherein, in response to input at the web-based interface, the host device is configured to communicate command data to the router to enable the debugger program to communicate with the debug interface of the node device, wherein the host device is configured to run a web browser and the web-based interface is run in the web browser, to test the target program.

* * * * *